United States Patent [19]
Nomiyama et al.

[11] Patent Number: 5,247,503
[45] Date of Patent: Sep. 21, 1993

[54] OPTICAL RECORDING AND REPRODUCING APPARATUS WITH SEPARATED HIGH AND LOW FREQUENCY SERVO SIGNALS

[75] Inventors: Takashi Nomiyama; Kaoru Yasukawa; Kiichi Ueyanagi; Shoji Yamaguchi; Daisuke Iguchi; Akemi Murakami, all of Kanagawa, Japan

[73] Assignee: Fuji Xerox Co., Ltd., Tokyo, Japan

[21] Appl. No.: 875,307

[22] Filed: Apr. 29, 1992

[30] Foreign Application Priority Data

Apr. 30, 1991 [JP] Japan ................... 3-124439

[51] Int. Cl.$^5$ ............................................. G11B 7/095
[52] U.S. Cl. ............................. 369/44.35; 369/44.15; 369/44.23
[58] Field of Search ............... 369/44.14–44.16, 369/44.23, 44.25, 44.29, 44.32, 44.35, 44.41, 112; 360/103

[56] References Cited

U.S. PATENT DOCUMENTS

| | | | |
|---|---|---|---|
| 4,613,961 | 9/1986 | Aarts | 369/44.32 |
| 4,688,201 | 8/1987 | Towner et al. | 369/112 X |
| 4,783,774 | 11/1988 | Enomoto | 369/44.32 X |
| 5,105,408 | 4/1992 | Lee et al. | 369/44.15 |

FOREIGN PATENT DOCUMENTS 63-55211 4/1988 Japan .

OTHER PUBLICATIONS

The 36th Meeting of the Japan Society of Applied Physics, 2p-ZB-5 and 2p-ZB-6, 1989, p. 905.

Primary Examiner—W. R. Young
Attorney, Agent, or Firm—Finnegan, Henderson, Farabow, Garrett & Dunner

[57] ABSTRACT

A fixed section of an optical recording and reproducing apparatus is provided with an actuator for optically controlling the fine tracking of a laser beam to be held at a predetermined position, by moving a diverging convex lens of a relay lens in a direction perpendicular to that of the optical axis; first and second filter circuits for separating a tracking error signal outputted from a differential amplifier connected to a two-split light-receiving element into a high-frequency-side signal and a low-frequency-side signal respectively; a first driving control circuit for controlling the driving of a linear motor for moving a movable section of the apparatus on the basis of the low-frequency-side signal separated by the first filter circuit; and a second driving control circuit for controlling the driving of the actuator on the basis of the high-frequency-side signal separated by the second filter circuit.

6 Claims, 11 Drawing Sheets

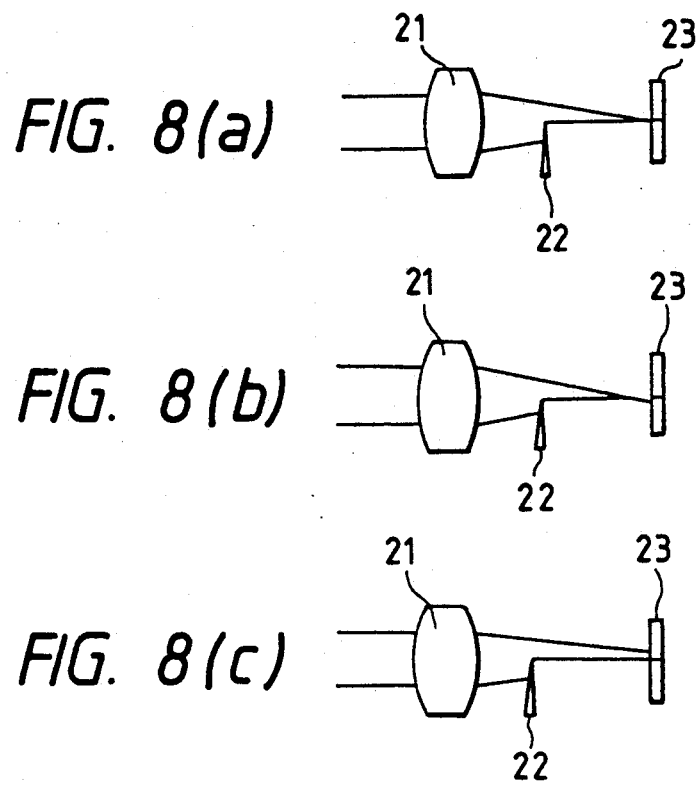
FIG. 8(a)
FIG. 8(b)
FIG. 8(c)
FIG. 9
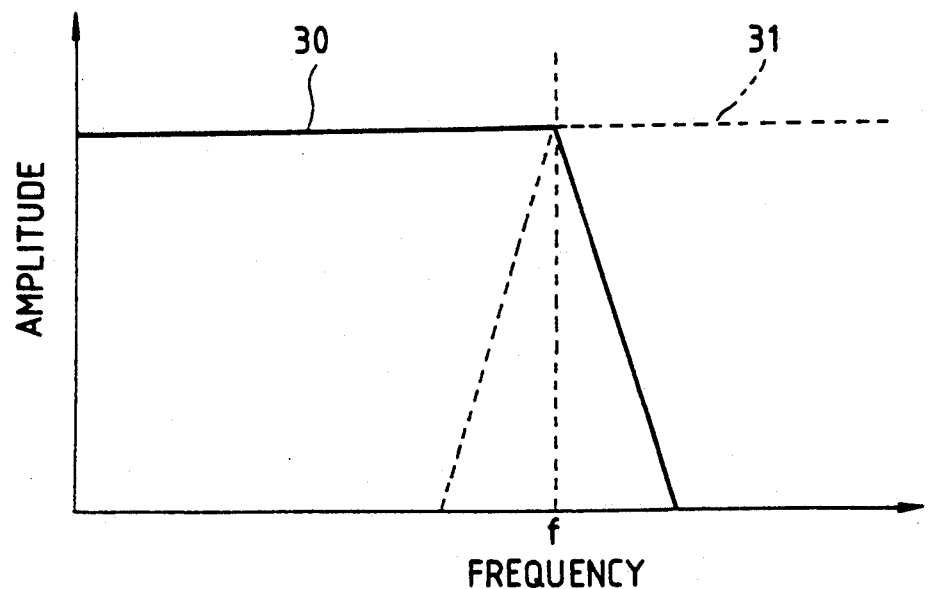

OPTICAL RECORDING AND REPRODUCING APPARATUS WITH SEPARATED HIGH AND LOW FREQUENCY SERVO SIGNALS

BACKGROUND OF THE INVENTION

1. Field of the Invention

The present invention relates to an optical recording and reproducing apparatus for effecting the recording, reproduction, erasure, and the like of information by using an optical recording medium such as an optical disk. More particularly, the present invention concerns an optical recording and reproducing apparatus capable of effecting tracking control accurately.

2. Description of the Related Art

Conventionally, as an optical recording and reproducing apparatus of this type, one disclosed in Japanese Utility Model Unexamined Publication No. Sho. 63-55211, for instance, is known. As shown in FIG. 14, this optical recording and reproducing apparatus comprises a movable section 102 having a slider 101 in which an objective lens 100 is incorporated, and a fixed section 105 having a light source 103 and a detecting system 104. The slider 101 incorporating the objective lens 100 is caused to float above the surface of an optical disk 106 by means of a dynamic-pressure air bearing effect, and the distance between the objective lens 100 and the optical disk 106 is held at a substantially fixed value. In this apparatus, a focus control system is adopted in which a focus error occurring due to fluctuations in the amount of floating caused by the surface vibration of the optical disk 106 is corrected by a focusing lens 107 provided in the fixed section 105.

Since the above-described optical recording and reproducing apparatus effects the automatic control of the focus by means of the focusing lens 107 provided in the fixed section, it is unnecessary to dispose an objective lens actuator for effecting the automatic control of the focus on the movable section 102 of an optical head. For this reason, the movable section 102 of the optical head can be made substantially compact and lightweight as compared with a conventional optical head, so that this optical recording and reproducing apparatus offers a promising technology capable of attaining high-speed access.

However, although the above-described optical recording and reproducing apparatus has a unique arrangement concerning the automatic control of the focus as described above, the apparatus adopts a conventional method concerning tracking control, so that the apparatus has the following problem: That is, as shown in FIG. 14, the above-described optical recording and reproducing apparatus has a tracking actuator 108 incorporated in the movable section 102, and this tracking actuator is comprised of a tracking coil 109 disposed on the slider 101 side where the objective lens 100 is incorporated and a permanent magnet 110 disposed on the movable section 102 side. The arrangement provided is such that fine tracking error of the floating-type optical head is corrected by means of the tracking actuator 108 disposed in the movable section 102, and the random access movement of the optical head to a target track is effected by a linear motor 111 for driving the movable section 102 in the radial direction of the optical disk 106.

For that reason, in the above-described floating-type optical head, the tracking actuator 108 comprised of the permanent magnet 110 and the tracking coil 109 needs to be mounted in the movable section 102 which is moved for an accessing operation. Although the movable section 102 is made lightweight as compared with the conventional one, the weight of the optical head increases by a portion corresponding to the weight of the tracking actuator 108. Hence, there has been a problem in that it is impossible to obtain acceleration sufficient for attaining high-speed access.

Therefore, a floating-type optical head which overcomes the problem of the above-described apparatus has been proposed. In the optical head, to attain high-speed access my making the movable section more lightweight and compact, the tracking actuator is removed from the movable section, and all the tracking control is effected by only the linear motor used for an accessing operation (The 36th Meeting of the Japan Society of Applied Physics, 2p-ZB-5, 6 (1989).

This floating-type optical head is arranged such that, as shown in FIG. 15, a movable section 120 is comprised of only a slider 121, an objective lens 122, and a mirror 123, this movable section 120 is connected to a linear motor 124 used for an accessing operation, and a fixed section 125 is comprised of a light source 126, a light detecting system 127, a relay lens 128 for adjusting the focus, and the like. In this head, the focusing control is effected through the following of the surface of a disk 129 by the slider 121 and the driving of the relay lens 128, and the tracking and seeking operations are effected by only the single linear motor 124 for driving the movable section 120.

In the case of the above-described optical head, since it is unnecessary for the tracking actuator to be provided in the movable section 120, so that the movable section 120 can be made substantially lightweight and compact, thereby making it possible to attain high-speed access.

Nevertheless, the above-described optical head has the following problem. That is, since this optical head is so arranged as to effect both the tracking and seeking operations by means of the single linear motor 124, even the fine tracking control for causing the movable section 120 of the optical head to follow one track is inevitably effected by the linear motor 124.

To effect this fine tracking control, however, although it is necessary to control the driving of the linear motor 124 in a high frequency band, the control of the driving of the linear motor 124 in a high frequency band becomes unstable, as shown in FIG. 12, owing to the inertial mass of the movable section 120 and the linear motor 124 itself.

For that reason, in order to ensure stable control of the driving of the linear motor 124 and operate a servo system for controlling the tracking operation stably, it is inevitable to set the frequency band for controlling the tracking servo to a narrow band. As a result, new problems arise in that the response speed of the linear motor 124 becomes slow, and that it is difficult to perform tracking for instantaneously controlling fine deviations in tracking, making it impossible to obtain sufficient tracking accuracy.

SUMMARY OF THE INVENTION

Accordingly, it is an object of the present invention to provide an optical recording and reproducing apparatus in which a movable section is rendered substantially lightweight and compact, and which is capable of attaining high-speed access and effecting tracking control with high accuracy, thereby overcoming the above-described drawbacks of the conventional art.

In order to attain the above object, the present invention provides an optical recording and reproducing apparatus comprising: a movable section including an objective lens for focusing a laser beam on an optical disk, and a slider for maintaining a distance between the objective lens and the optical disk so as to be substantially constant by causing the objective lens to float from a surface of the optical disk by means of a dynamic-pressure air bearing effect, the movable section being moved along a radial direction of the optical disk by driving means; and a fixed section including a light source for emitting the laser beam, detecting means for detecting amounts of deviation in focusing and tracking, focusing control means for controlling focusing on the basis of a detection signal from the detecting means, tracking control means for optically controlling fine tracking of the laser beam, a signal separating circuit for separating a signal outputted from the detecting means and corresponding to an amount of deviation in tracking into a high-frequency-side signal and a low-frequency-side signal, a first driving control circuit for controlling the driving of the driving means on the basis of the low-frequency-side signal separated by the signal separating circuit, and a second driving control circuit for controlling the driving of the tracking control means on the basis of the high-frequency-side signal separated by the signal separating circuit.

The above and other objects, features and advantages of the present invention will become more apparent from the following detailed description of the invention when read in conjunction with the accompanying drawings.

BRIEF DESCRIPTION OF THE DRAWINGS

FIGS. 8(a), 8(b) and 8(c) are diagrams illustrating states of detection of a focus error signal, respectively;

FIG. 9 is a graph showing characteristics of a filter circuit;

DETAILED DESCRIPTION OF THE PREFERRED EMBODIMENT

Figure 1:
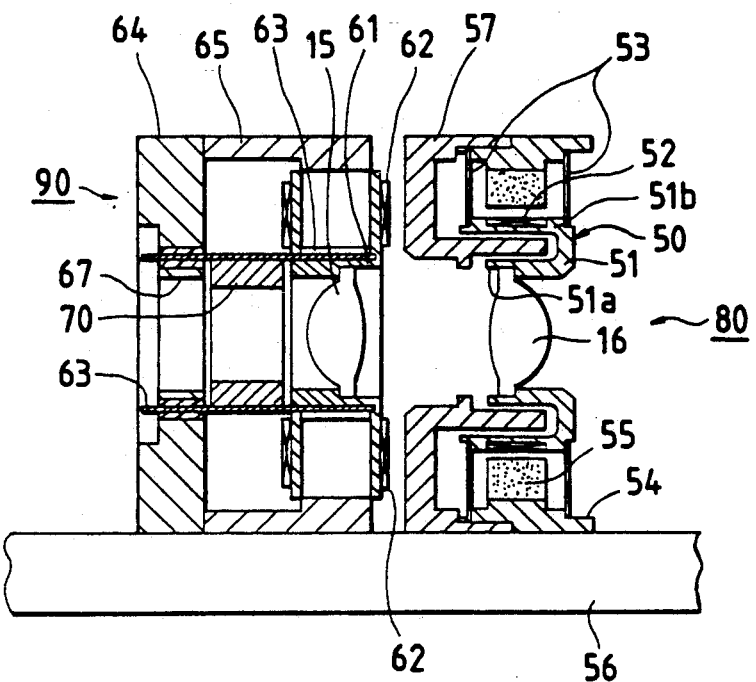
FIG. 1 is a cross-sectional view of an essential portion of an optical recording and reproducing apparatus according to an embodiment of the present invention.

Referring now to the accompanying drawings, a description will be given of a preferred embodiment of the present invention.

FIGS. 5 to 7(b) illustrate an embodiment of the optical recording and reproducing apparatus according to the present invention. As shown in the drawings, the optical recording and reproducing apparatus 1 comprises a movable section 2 and a fixed section 3 in terms of its major sections.

The movable section 2 includes an objective lens 5 for converging a laser beam LB onto an optical disk 4 and a slider 6 for causing the objective lens 5 to float from the optical disk 4 by means of the dynamic-pressure air bearing effect and for maintaining the distance between the objective lens 5 and the optical disk 4 so as to be substantially constant. The movable section 2 is adapted to be driven in the radial direction of the optical disk 4 by means of a driving means 7.

The fixed section 3 includes a semiconductor laser 8 serving as a light source for emitting the laser beam LB, a detecting means 9 for detecting an amount of deviation in focusing and tracking, and a focusing control means 10 for controlling focusing on the basis of a detection signal from the detecting means 9.

Figure 6:
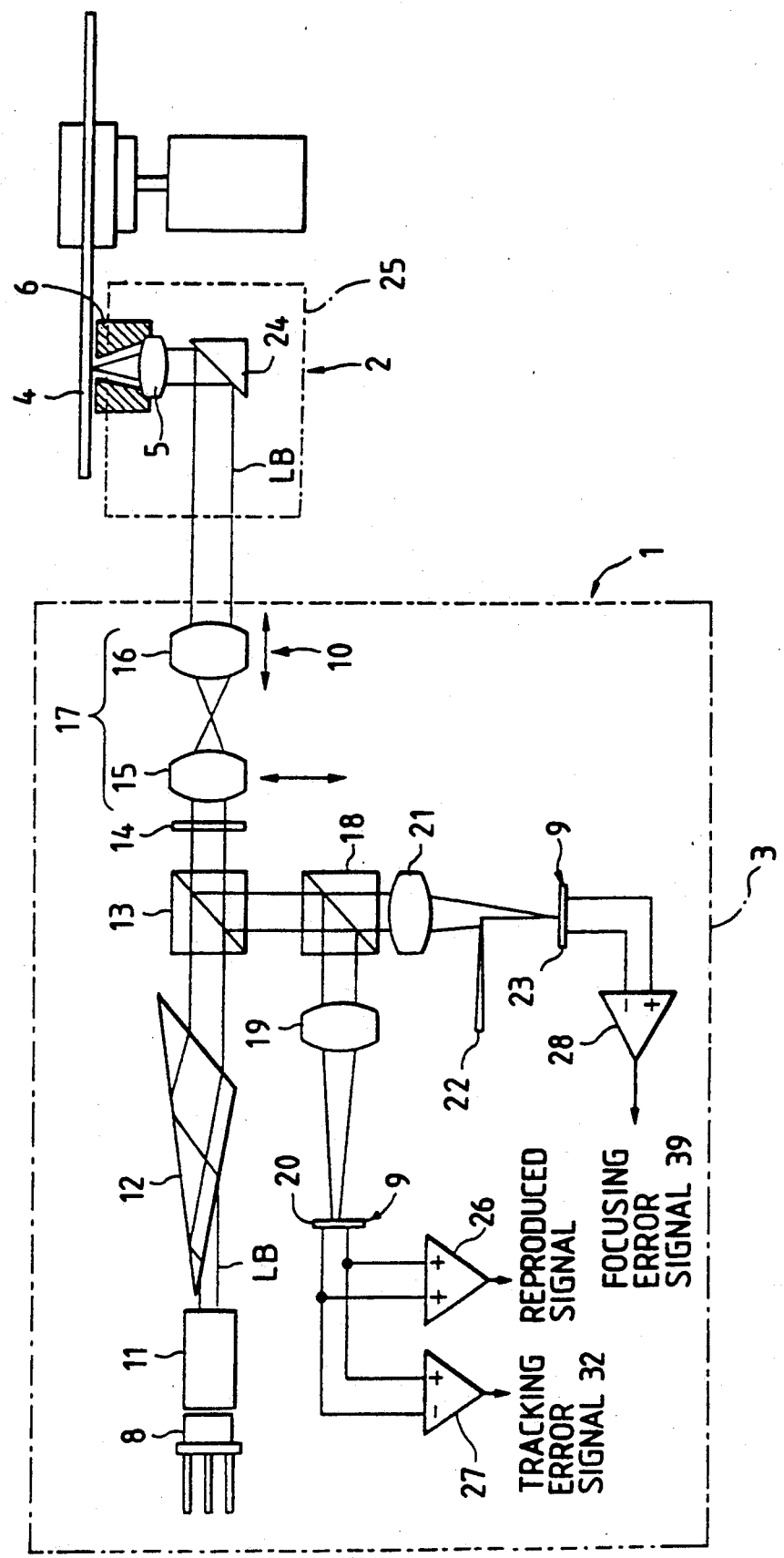
FIG. 6 is a diagram schematically illustrating the optical system of the optical recording and reproducing apparatus according to the embodiment of the present invention.
Figure 7A:
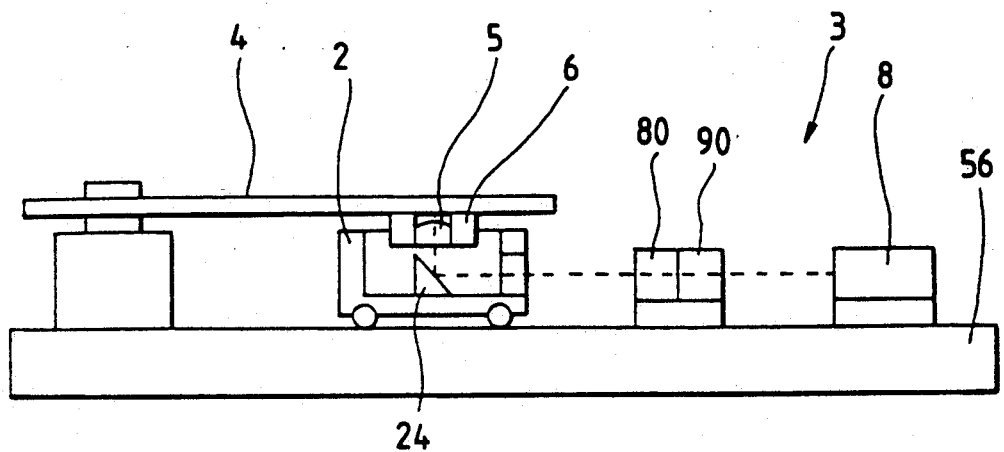
FIGS. 7(a) and 7(b) are a front elevational view and a perspective view of an essential portion of the optical system according to the embodiment.
Figure 7B:
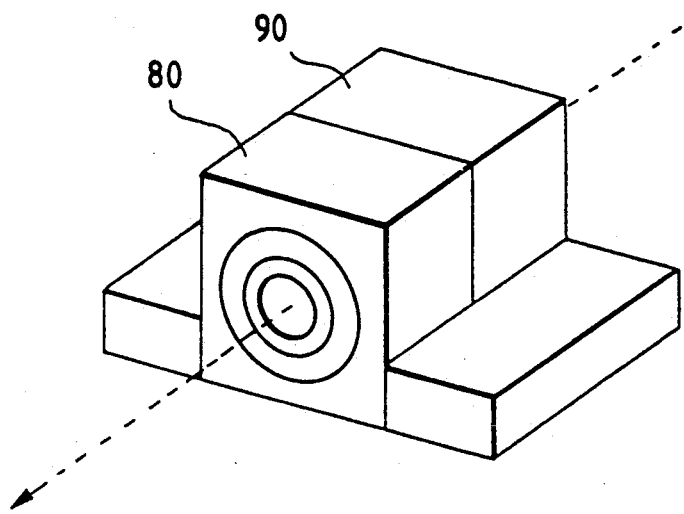

To give a more detailed description of the arrangement of the above-described optical recording and reproducing apparatus 1, as shown in FIG. 6, in addition to the aforementioned three components the fixed section 3 includes the following: a collimator lens 11 for converting the laser beam LB having an elliptical cross section emitted from the semiconductor laser 8 into parallel rays of light; a beam-shaping prism 12 for shaping the laser beam LB converted into parallel rays of light by the collimator lens 11, into light of a circular cross section; a deflection beam splitter 13 for separating the shaped laser beam LB into light to be applied to the optical disk 4 and light reflected from the optical disk 4; a ¼ wavelength plate 14 for converting the linearly deflected light and the circularly deflected light alternately; a relay lens 17 serving as the focusing control means 10 and comprised of both a diverging convex lens 15 for focusing the laser beam LB to a focal point F and then diverging the same from this focal point F and a converging convex lens 16 for converting the diverged laser beam LB into parallel rays of light and introducing the same to the movable section 2, so as to control the focusing of the laser beam LB transmitted through the ¼ wavelength plate 14; a beam splitter 18 for splitting the laser beam LB separated by the deflection beam splitter 13 and reflected from the optical disk 4 further into two beams; a focusing lens 19 for focusing one laser beam LB separated by the beam splitter 18; a two-split light-receiving element 20 for receiving the laser beam LB focused by the focusing lens 19; a focusing lens 21 for focusing the other laser beam LB separated by the beam splitter 18; a knife edge 22 for interrupting one side of the laser beam LB focused by the focusing lens 21; and a two-split light-receiving element 23 for receiving the laser beam LB fetched by the knife edge 22.

Meanwhile, as shown in FIGS. 5 to 7(a), the above-described movable section 2 is provided with a mirror 24 for reflecting the laser beam LB converted into parallel rays of light by the relay lens 17 toward the optical disk 4, the objective lens 5 for causing the laser beam LB reflected by the mirror 24 to be converged and applied to the optical disk 4, and the floating slider 6 for causing the objective lens 5 to float from the surface of the optical disk 4 in such a manner that the distance between the objective lens 5 and the optical disk 4 becomes substantially fixed, by means of the dynamic-pressure air bearing effect. This floating slider 6 is connected to a movable section body 25 via an unillustrated leaf spring.

Figure 5:
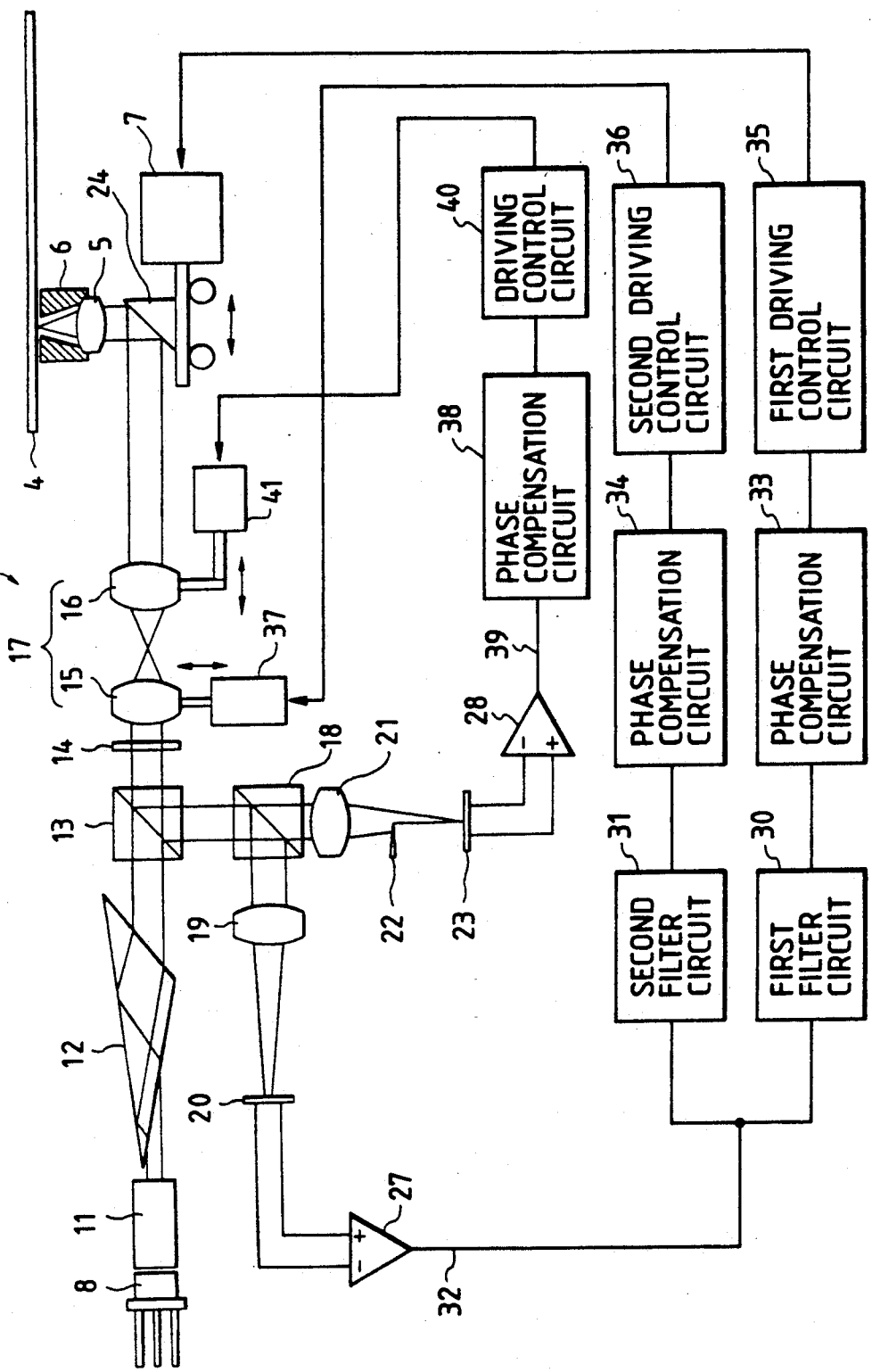
FIG. 5 is a diagram schematically illustrating an optical system and a control system of the optical recording and reproducing apparatus according to the embodiment of the present invention.

In addition, as shown in FIGS. 5 and 6, the movable section 2 is movable in the radial direction of the optical disk 4 by means of the linear motor 7 serving as the driving means.

In the above-described optical recording and reproducing apparatus 1, the laser beam LB having an elliptical cross section emerging from the semiconductor laser 8 disposed in the fixed section 3 is converted into parallel rays of light by the collimator lens 11, and is then shaped into a beam having a circular cross section by the beam shaping prism 12. Subsequently, this laser beam LB passes through the deflection beam splitter 13 and the ¼ wavelength plate 14, is converted into parallel rays of light by the relay lens 17, and is made to enter the movable section 2. The laser beam LB is then made to converge by the objective lens 5 and is irradiated to an unillustrated track on the optical disk 4.

The reflected light from the track on the optical disk 4 returns through the same route as the one described above, is reflected by the deflection beam splitter 13, and is separated by the beam splitter 18 into two directions. An image of one laser beam LB is formed on the two-split light-receiving element 20, and image information recorded on the track is simultaneously read by this two-split light-receiving element 20. As shown in FIG. 6, the two-split light-receiving element 20 is connected to a summing amplifier 26, and a reproduced signal of the image information is obtained as an output signal of the summing amplifier 26. Further, the two-split light-receiving element 20 is also connected to a differential amplifier 27, and a tracking error signal 32 is obtained as an output signal of the differential amplifier 27.

In addition, as for the other laser beam LB obtained by being divided by the beam splitter 18, a portion on one side of the beam is interrrupted by the knife edge 22 through the focusing lens 21, and an image of only the uninterrupted portion of the beam is formed on the two-split light-receiving element 23. The two-split light-receiving element 23 is connected to a differential amplifier 28, as shown in FIG. 6, and a focusing error signal 39 is obtained as an output signal of the differential amplifier 28.

As is known, the above-described knife edge method is used to obtain a focusing error signal by making use of a phenomenon in which the light-receiving state of the two-split light-receiving element 23 changes in response to a focusing state when an image of the laser beam LB formed on one side of the two-split light-receiving element 23 is interrupted by the knife edge 22.

In an in-focus state, as shown in FIG. 8(a), since the light is focused on only the center of the two-split light-receiving element 23, the output of the differential amplifier 28 becomes 0. In an out-of-focus state, as shown in FIGS. 8(b) and 8(c), since the light is focused on only one side of the two-split light-receiving element 23, the output of the differential amplifier 28 becomes + or −, thereby obtaining a focusing error signal.

The fixed section of this optical recording and reproducing apparatus is provided with the following: tracking control means for optically effecting fine tracking control; a signal separating circuit for separating a signal outputted from the detecting means and corresponding to an amount of deviation in tracking into a high-frequency-side signal and a low-frequency-side signal; a first driving control circuit for controlling the driving of the driving means for driving the movable section, on the basis of the low-frequency-side signal separated by the signal separating circuit; and a second driving control circuit for controlling the driving of the tracking control means for effecting tracking control, on the basis of the high-frequency-side signal separated by the signal separating circuit.

To give a more detailed description, in FIG. 5, reference numerals 30 and 31 are first and second filter circuits serving as signal separating circuits to which the tracking error signal 32 outputted from the differential amplifier 27 is inputted, respectively. The tracking error signal 32 is separated into two frequency components, i.e., a low-frequency-side signal and a high-frequency-side signal, by means of the first filter circuit 30 for transmitting only the low-frequency-side signal and the second filter circuit 31 for transmitting only the high-frequency-side signal. The separating frequencies by these first and second filter circuits 30 and 31 are set to specific frequencies in the range of, for instance, 2 kHz–3 kHz. Thus, the tracking error signal 32 is divided into two frequency components with a specific frequency f as a boundary by means of the first and second filter circuits 30 and 31, as shown in FIG. 9.

The first and second filter circuits 30 and 31 are connected to phase compensation circuits 33 and 34, respectively. These phase compensation circuits 33 and 34 effect phase compensation by providing signal processing such as amplifying a high-frequency-side component of the signal transmitted through the first and second filter circuits 30 and 31. The phase compensation circuits 33 and 34 are connected to first and second driving control circuits 35 and 36, respectively. The first and second driving control circuits 35 and 36 are connected to the linear motor 7 serving as the driving means and an actuator 37 serving as the tracking control means, respectively.

The actuator 37 optically controls the fine tracking of the laser beam LB by moving the diverging convex lens 15 of the relay lens 17 in a direction perpendicular to the optical axis.

Furthermore, the focusing error signal 39 outputted from the differential amplifier 28 is inputted to a phase compensation circuit 38. This phase compensation circuit 38 effects phase compensation by providing predetermined signal processing with respect to the focusing error signal 39. The phase compensation circuit 38 is connected to a third driving control circuit 40, and this driving control circuit 40 is connected to an actuator 41. The actuator 41 optically controls the focusing of the laser beam LB by moving the converging convex lens 16 of the relay lens 17 in the direction of the optical axis.

In this embodiment, the tracking control means provided in the fixed section has the lens for controlling tracking as the lens is moved in the direction perpendicular to that of the optical axis. This lens for tracking control is arranged to be supported by a resilient supporting member with a high rigidity so as to be movable in the direction perpendicular to that of the optical axis.

In FIGS. 1, 2, 7(a) and 7(b), reference numerals 80 and 90 denote a focus adjusting section and a tracking adjusting section, respectively.

Figure 2:
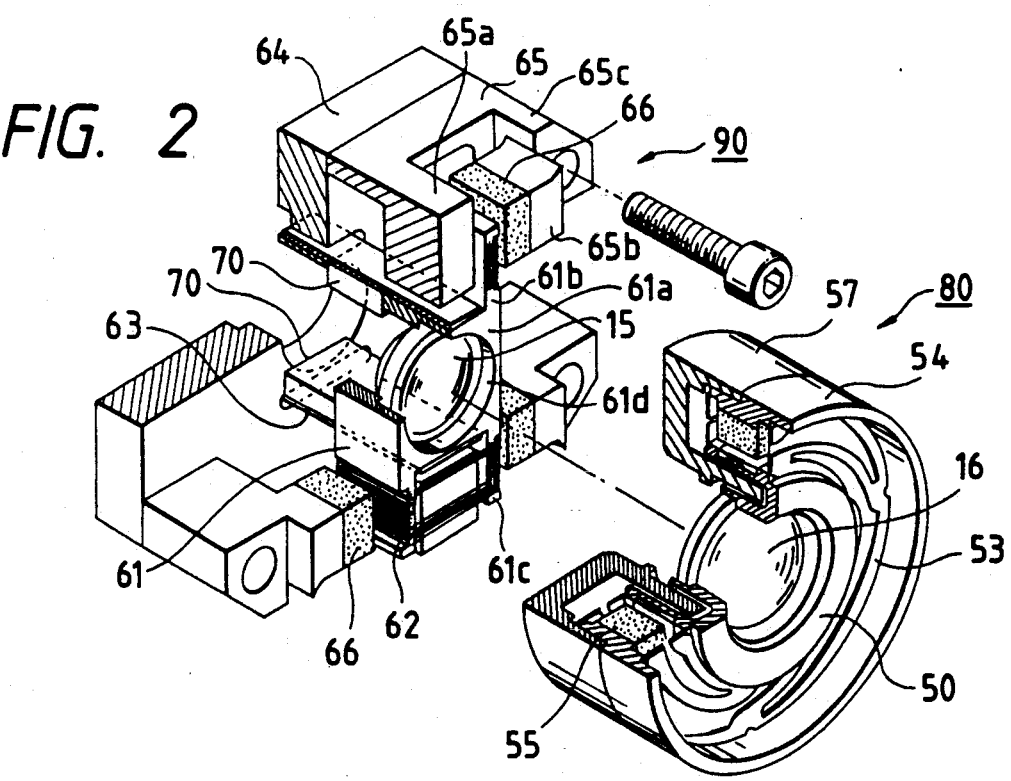
FIG. 2 is a perspective view, partly in section, of the essential portion.
Figure 3:
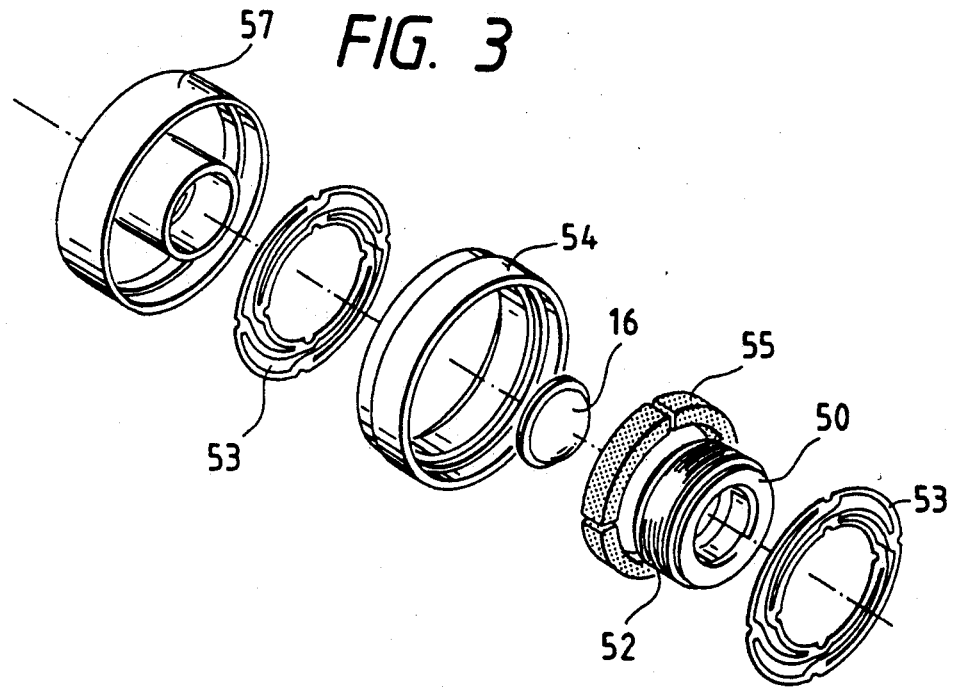
FIG. 3 is an exploded perspective view of a part of the essential portion.
Figure 10:
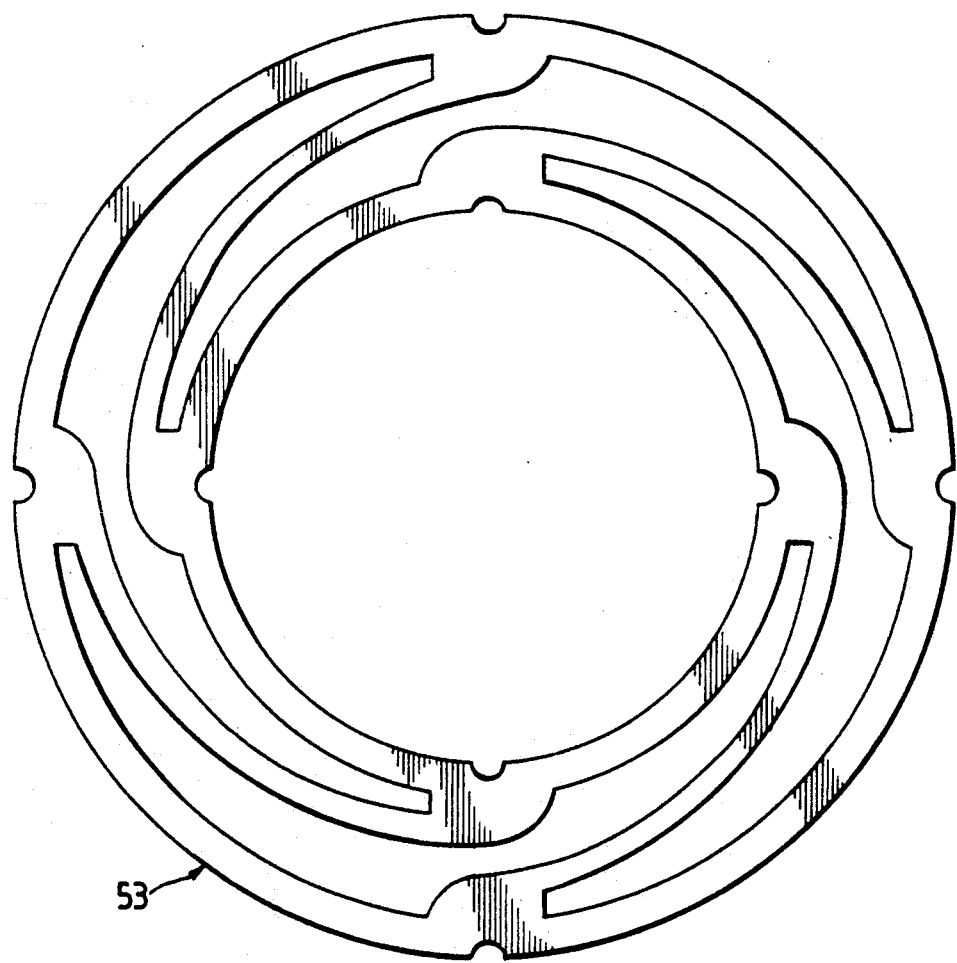
FIG. 10 is a front elevational view of a focus spring.

As shown in FIGS. 1 to 3, the converging convex lens 16 for focus adjustment has its outer periphery secured to an annular focus bobbin 50. This annular focus bobbin 50 has an annular portion 51 shaped in a substantially U-shaped cross section. The outer periphery of the converting convex lens 16 is secured to an inner peripheral portion 51a of the annular portion 51, and a focus coil 52 is wound around an outer peripheral portion 51b of the annular portion 51. The focus bobbin 50 is arranged such that the outer peripheral portion 51b is supported by a first focus housing 54 disposed around the outer periphery of the focus bobbin 50, by means of two annular focus springs 53, so that the focus bobbin 50 is capable of moving in the direction of the optical axis by means of the two annular focus springs 53. Each of the focus springs 53 is formed in a configuration shown in FIG. 10. These focus springs 53 are arranged such that their inner peripheries are secured to the outer peripheral portion 51b of the annular portion 51 of the focus bobbin 50 in a spaced-apart relation with each other along the direction of the optical axis, and their outer peripheries are secured to the first focus housing 54.

The first focus housing 54 also serves as a magnetic circuit yoke, and an annular permanent magnet 55 is secured to an inner peripheral surface of the first focus housing 54. The magnetic flux of this permanent magnet 55 is adapted to cross the focus coil 52 wound around the focus bobbin 50, and as a predetermined current is allowed to flow across the focus coil 52, the converging convex lens 16 secured in the focus bobbin 50 can be moved in the direction of the optical axis. The first focus housing 54 has its axial end secured to a second focus housing 57, and this second focus housing 57 is mounted on a fixed base 56.

Figure 4:
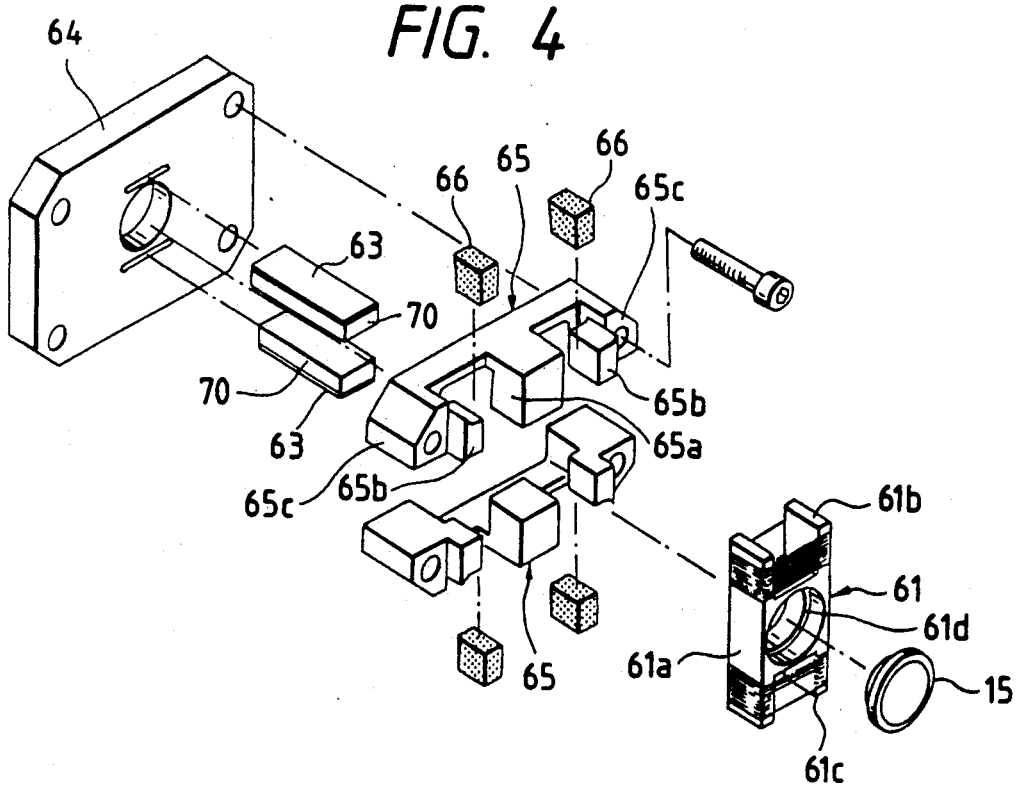
FIG. 4 is an exploded perspective view of another part of the essential portion.

Meanwhile, in the tracking adjustment means, as shown in FIGS. 1, 2 and 4, the diverging convex lens 15 is secured to a tracking bobbin 61. As shown in FIGS. 2 and 4, the tracking bobbin 61 comprises a central portion 61a formed in a square configuration and two pairs of legs 61b and 61c disposed at transversely opposite ends of the central portion 61a in such a manner as to project vertically away from each other, thereby forming a substantially H-shaped configuration as viewed from the front. The diverging convex lens 15 is secured in a circular opening 61d provided in the central portion 61a. A pair of tracking coils 62 are respectively wound around the legs 61b and 61c of the tracking bobbin 61. In addition, one ends of two resilient supporting members 63 are respectively secured to upper and lower ends of the central portion 61a of the tracking bobbin 61, as shown in FIG. 1. The other ends of these resilient supporting members 63 are secured to a tracking base 64 disposed on one side of the tracking bobbin 61 as viewed in the direction of the optical axis. The diverging convex lens 15 secured in the tracking bobbin 61 is capable of moving in the direction perpendicular to that of the optical axis via the two resilient supporting members 63.

The resilient supporting members 63 are formed of a resilient material having a high rigidity such as aluminum, copper, or stainless steel. The resilient supporting members 63 have an increased rigidity in such a manner that the basic frequency of vibrations becomes, for instance, 60 Hz or more.

A pair of viscoelastic members 70 capable of substantially attenuating vibrations are secured to the mutually opposing surfaces of the two resilient supporting members 63 between the tracking bobbin 61 and the tracking base 64 except for a portion where the laser beam passes through. As the viscoelastic members 70, a material such as silicone rubber, urethane rubber, or butyl rubber is used. However, any viscoelastic material has an effect in attenuating vibrations, so that the material of the viscoelastic members 70 is not restricted to those mentioned above.

Furthermore, as shown in FIGS. 2 and 4, a pair of magnetic circuit yokes 65 having an E-shaped configuration as viewed from the top are disposed on the upper and lower sides of the tracking bobbin 61, respectively. A central projection 65a of each of these magnetic circuit yokes 65 is disposed in such a manner as to be located between the mutually opposing legs 61b and the mutually opposing legs 61c of the tracking bobbin 61, respectively, as shown in FIG. 2. A pair of projections 65b at opposite ends of each of the magnetic circuit yokes 65 are disposed outside the opposing legs 61b and 61c of the tracking bobbin 61, respectively. In addition, a permanent magnet 66 is secured to an inner surface of each of the projections 65b at the opposite ends of the magnetic circuit yoke 65, and the magnetic flux of these permanent magnets 66 is adapted to cross the tracking coils 62 wound around the tracking bobbin 61. As a predetermined current is allowed to flow across the tracking coils 62, the diverging convex lens 15 secured to the tracking bobbin 61 can be moved in the direction perpendicular to that of the optical axis.

As shown in FIGS. 2 and 4, each of the magnetic circuit yokes 65 is secured to the tracking base 64 via arm portions 65c thereof. The other ends of the two resilient supporting members 63 are also secured to the tracking base 64, as described above. As shown in FIG. 1, the tracking base 64 is formed in a plate-like shape of a large thickness and has a lower end mounted on the fixed base 56. Further, reference numeral 67 in FIG. 1 denotes an opening formed in the tracking base 64.

The above-described focus adjusting section 80 and the tracking adjusting section 90 are mounted on the fixed base 56 and are adjusted in such a manner that the optical axis of the diverging convex lens 15 and that of the converging convex lens 16 are aligned with each other, as shown in FIG. 1.

In the above-described arrangement, in the optical recording and reproducing apparatus according to this embodiment, tracking control is effected as follows: That is, in the optical recording and reproducing apparatus 1, as shown in FIG. 5, the laser beam LB emitted from the semiconductor laser 8 is applied to the optical disk 4 via the collimator lens 11, the beam shaping prism 12, the deflection beam splitter 13, the ¼ wavelength plate 14, the relay lens 17, the mirror 24 and the objective lens 5. Then, the reflected light from the optical disk 4 is received by the two-split light-receiving element 20 via the objective lens 5, the mirror 24, the relay lens 17, the ¼ wavelength plate 14, the deflection beam splitter 13, the beam splitter 18, and the focusing lens 19. Meanwhile, the laser beam LB separated by the beam splitter 18 is received by the two-split light-receiving element 23 via the focusing lens 21. Then, the tracking error signal 32 is obtained from the differential amplifier 27 connected to the two-split light-receiving element 20, while the focusing error signal 39 is obtained from the differential amplifier 28 connected to the two-split light-receiving element 23.

The floating slider 6 floats up in the vicinity of the optical disk 4 while maintaining a substantially fixed distance with respect to the optical disk 4. However, it is impossible to perfectly maintain that fixed distance, and focusing error occurs. This focusing error can be corrected by causing the converging convex lens 16 in the focus adjusting section to be driven along the direction of the optical axis.

In addition, the tracks on the optical disk 4 have some eccentricity. While a low-frequency component in the eccentricity can be controlled and eliminated by the linear motor 7, a high-frequency component can be controlled and eliminated by driving the diverging convex lens 15 in the tracking adjusting section in the direction perpendicular to that of the optical axis in FIGS. 5 and 6.

That is, the tracking error signal 32 outputted from the differential amplifier 27 is inputted to the first and second filter circuits 30 and 31, and the low-frequency component is extracted by the first filter circuit 30, while the high-frequency component is extracted by the second filter circuit 31.

The output signal from the second filter circuit 31 is inputted to the phase compensation circuit 34, and is subjected to phase compensation by this phase compensation circuit 34 such as by being amplified in such a manner that the high-frequency side becomes large. Then, the output signal from the phase compensation circuit 34 is inputted to the second driving control circuit 36, and the actuator 37 is driven by the second driving control circuit 36 in response to a difference between the output signal from the phase compensation circuit 34 and a predetermined value.

Figure 11:
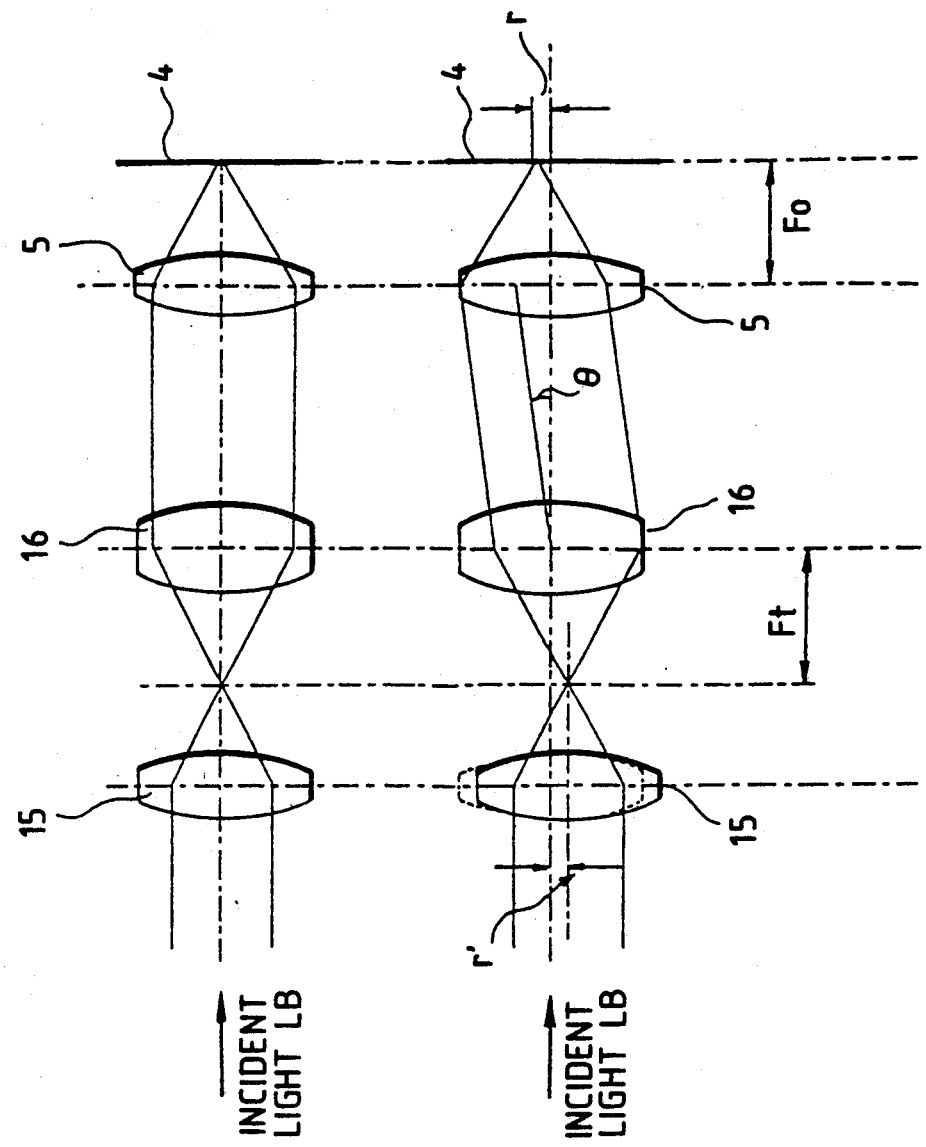
FIGS. 11(a) and 11(b) are diagrams illustrating a tracking adjusting operation, respectively.

As shown in FIGS. 5 and 6, this actuator 37 optically controls the fine tracking of the laser beam LB by moving the diverging convex lens 15 of the relay lens 17 in the direction perpendicular to that of the optical axis. That is, as shown in FIG. 11(a), when the high-frequency component of the tracking error signal 32 is in agreement with a predetermined value, and the laser beam converged by the objective lens 5 is accurately following a predetermined track, the actuator 37 holds the diverging convex lens 15 of the relay lens 17 at a predetermined position. On the other hand, as shown in FIG. 11(b), in the event that the high-frequency component of the tracking signal 32 has deviated from the predetermined value, and laser beam LB converged by the objective lens 5 has deviated from the predetermined track on the optical disk 4 by a distance r, the actuator 37 moves the diverging convex lens 15 by a distance r' in the direction perpendicular to that of the optical axis and in a direction opposite to that in which the laser beam LB has deviated, thereby allowing the laser beam LB to track the predetermined track on the disk 4. The aforementioned distance r' can be given by the following formula:

$$r' = (Ft/FO) \cdot r$$

where Ft represents a focal length of the diverging convex lens 15, and FO represents a focal length of the objective lens 5.

Meanwhile, the output signal from the first filter circuit 30 is inputted to the phase compensation circuit 33, and is subjected to phase compensation by this phase compensation circuit 33 such as by being amplified in such a manner that the high-frequency side of the signal becomes large. Then, the output signal from the phase compensation circuit 33 is inputted to the first driving control circuit 35, and the linear motor 7 is driven by the driving control circuit 35 in response to such as a signal representing a difference between the output signal from the phase compensation circuit 33 and the targeted track No.

The linear motor 7 is used to move the movable section 2 in the radial direction of the optical disk 4, as shown in FIG. 5. The linear motor 7 causes the movable section 2 to follow the targeted track on the optical disk 4 in response to the low-frequency side signal outputted from the first filter circuit 30.

The diverging convex lens 15 in the tracking adjusting section is secured to the tracking bobbin 60, and the tracking bobbin 60 is supported by the two resilient supporting members 63 having a high rigidity. Hence, it is possible to obtain stable vibration characteristics up to a high frequency, so that it is possible to sufficiently cope with the high-speed rotation of the optical disk 4. Furthermore, since viscoelastic members 70 capable of substantially attenuating vibrations are respectively secured to the two resilient supporting members 63, irregular vibration components and the like can be absorbed, so that excellent vibration characteristics can be obtained, and stable, highly accurate tracking servo control becomes possible.

As described above, the fixed section 3 is provided with the following: the actuator 37 for optically controlling the fine tracking of the laser beam LB to be held at a predetermined position, by moving the diverging convex lens 15 of the relay lens 17 in the direction perpendicular to that of the optical axis; the first and second filter circuits 30 and 31 for separating the tracking error signal 32 outputted from the differential amplifier 27 connected to the two-split light-receiving element 20 into a high-frequency-side signal and a low-frequency-side signal, respectively; the first driving control circuit 35 for controlling the driving of the linear motor 7 on the basis of the low-frequency-side signal separated by the first filter circuit 30; and the second driving control circuit 36 for controlling the driving of the actuator 37 on the basis of the high-frequency-side signal separated by the second filter circuit 31.

For that reason, since it is unnecessary for the movable section 2 to be provided with any members for effecting tracking control, it is possible to render the movable section 2 of the optical recording and reproducing apparatus 1 substantially lightweight and compact. At the same time, the rigidity of the movable section 2 can be increased, and high-speed access can be attained.

Figure 12:
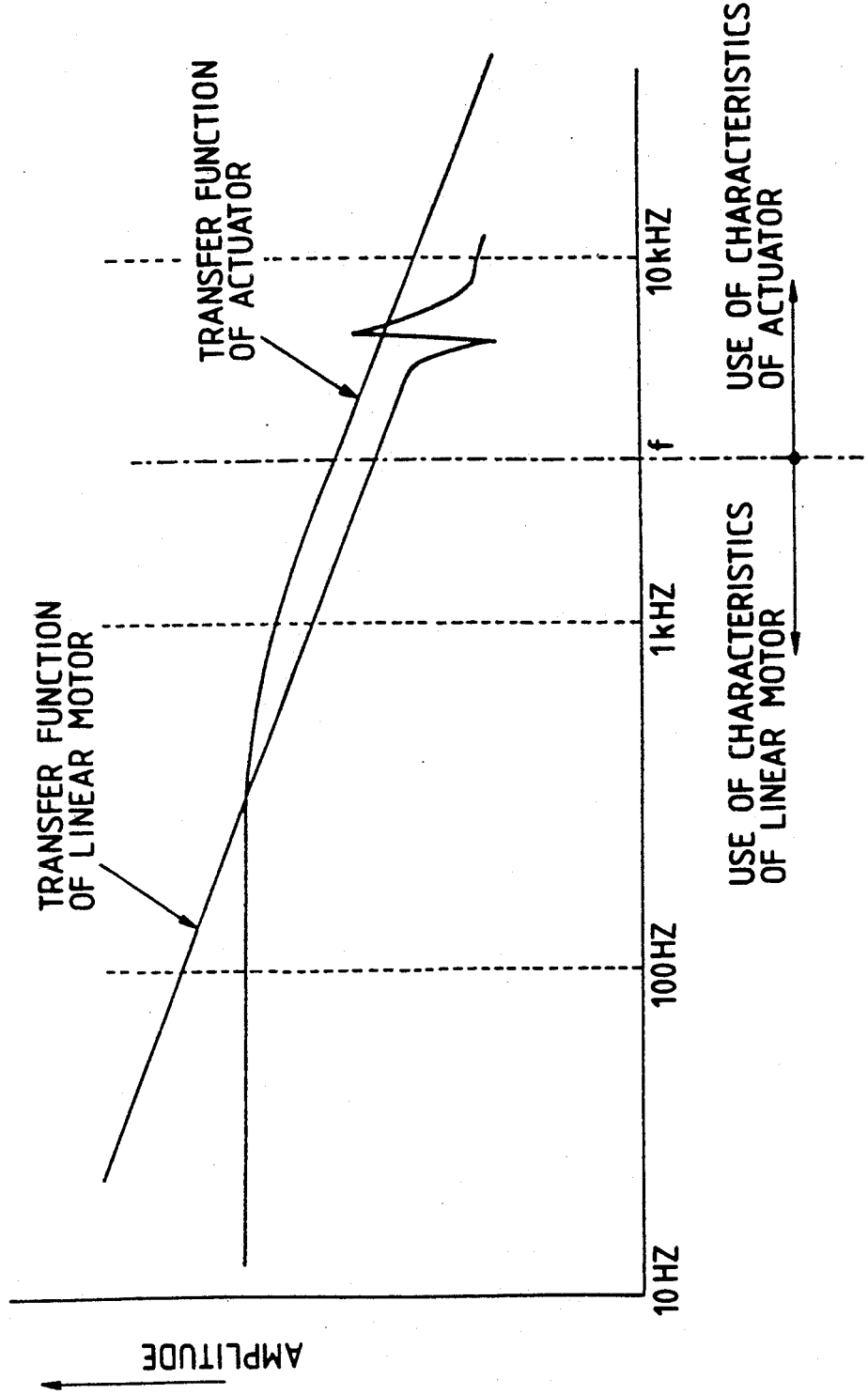
FIG. 12 is a graph showing operating characteristics of the apparatus according to the embodiment.

In addition, since the tracking error signal 32 outputted from the differential amplifier 27 connected to the two-split light-receiving element 20 is separated by the first and second filter circuits 30 and 31 into a high-frequency-side signal and a low-frequency-side signal, and the driving of the linear motor 7 is controlled by the first driving control circuit 35 on the basis of the low-frequency-side signal separated by the first filter circuit 30, the low-frequency-side deviation in tracking can be controlled by the linear motor 7 excelling in the low-frequency-side frequency characteristics, as shown in FIG. 12, so that the low-frequency-side tracking can be effected with high accuracy. Meanwhile, the driving of the actuator 37 is controlled by the second driving control circuit 36 on the basis of the high-frequency-side signal separated by the second filter circuit 31. Since this actuator 37 optically controls the fine tracking of the laser beam, the actuator 37 excels in the high-frequency-side frequency characteristics. For that reason, the high-frequency-side deviation in tracking can be controlled by the actuator 37 excelling in the high-frequency-side frequency characteristics, as shown in FIG. 12, thereby making it possible to effect tracking control with high accuracy. Moreover, since large deviations in tracking can be corrected through control by the linear motor 7, the amount of deviation in tracking to be corrected by the diverging convex lens 15 is very small (several microns or less). For that reason, since the amount of movement of the diverging convex lens 15 is reduced, it is possible to appreciably reduce the deterioration of the image-forming performance of the optical system due to the occurrence of aberrations owing to the fact that the diverging convex lens 15 deviates from the optical axis.

Furthermore, since the diverging convex lens 15 is supported by two resilient supporting members 63 having a high rigidity, it is possible to obtain stable vibration characteristics up to a high frequency, and it is also possible to sufficiently cope with the high-speed rotation of the optical disk 4. At the same time, since the viscoelastic members 70 capable of substantially attenuating vibrations are secured to the two resilient supporting members 63 respectively, irregular vibration components and the like can be absorbed, excellent vibration characteristics can be obtained up to a high frequency, and it is possible to sufficiently cope with the high-speed rotation of the optical disk 4. Thus, it is possible to effect more stable, highly accurate tracking servo control as compared with the conventional art.

Figures 13A, 13B:
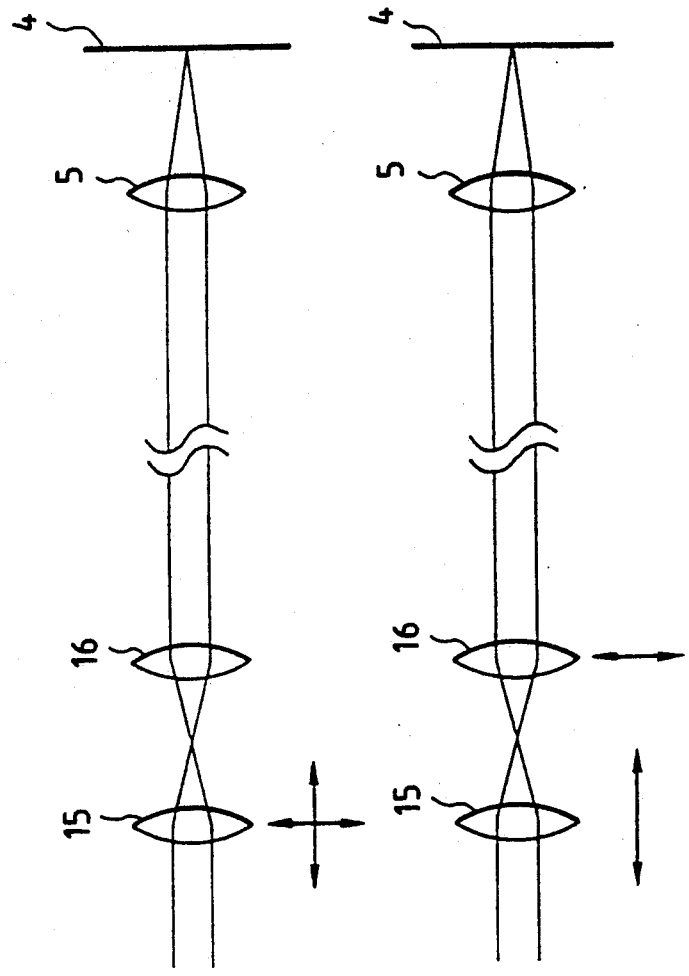
FIGS. 13(a) and 13(b) are diagrams illustrating the tracking and focusing adjusting operations, respectively.
Figure 14:
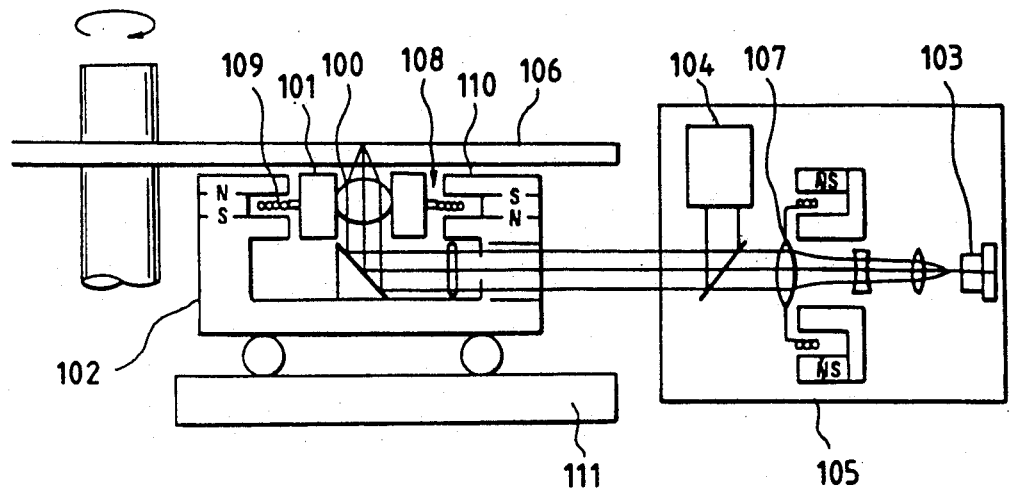
FIG. 14 is a schematic diagram of a conventional optical recording and reproducing apparatus.
Figure 15:
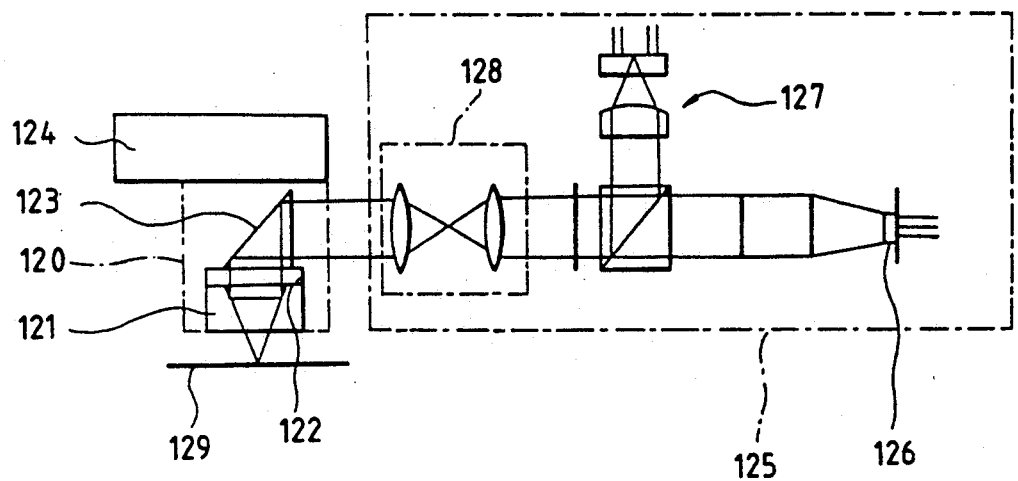
FIG. 15 is a schematic diagram of another conventional optical recording and reproducing apparatus.

Although in the above-described embodiment, a description has been given of a case in which tracking control is effected by moving the diverging convex lens 15 of the relay leans 17 in the direction perpendicular to that of the optical axis, and focusing control is effected by moving the converging convex lens 16 of the relay lens 17 in the direction of the optical axis, the present invention is not restricted to the same. For instance, as shown in FIG. 13(a), both focusing and fine tracking can be controlled by means of one actuator if an actuator capable of driving either of the convex lenses 15 and 16 (in the illustrated example, the convex lens 15) of the relay lens 17 in the direction of the optical axis and in the direction perpendicular to the same, i.e., in the directions of two axes, is used, and if this actuator is driven in response to the focusing error signal and a high-frequency-side signal in the tracking error signal. In this case, the actuator may be disposed at a position on either of the diverging convex lens 15 side or the converging convex lens 16 side of the relay lens 17.

Alternatively, as shown in FIG. 13(b), the converging convex lens 16 of the relay lens 17 may be moved in the direction perpendicular to that of the optical axis to effect tracking control. In this case, the diverging convex lens 15 of the relay lens 17 is moved in the direction of the optical axis to effect focusing control, as shown in the same figure.

As described above, the fine tracking control may be effected by either the diverging convex lens 15 or the converging convex lens 16 of the relay lens 17, or control of both focusing and fine tracking may be effected by one of the diverging convex lens 15 and the converging convex lens 16 of the relay lens 17. However, since the actuator for moving one lens in the directions of two axes is poor in the frequency response characteristics as compared with the actuator for moving it in the direction of one axis, the control system shown in FIG. 13(b) and the embodiment, in which one lens is moved in the direction of one axis only, is superior to the control system shown in FIG. 13(a).

By virtue of the above-described arrangement and operation, the present invention makes it possible to render the movable section of the optical recording and reproducing apparatus substantially lightweight and compact and is capable of attaining high-speed access. In addition, the present invention can provide an optical recording and reproducing apparatus capable of effecting highly accurate tracking control.

What is claimed is:

1. An optical recording and reproducing apparatus comprising:
   a movable section including an objective lens for focusing a laser beam on an optical disk, and a slider for maintaining a distance between the objective lens and the optical disk so as to be substantially constant by causing the objective lens to float from a surface of the optical disk by means of a dynamic-pressure air bearing effect, said movable section being moved along a radial direction of the optical disk by driving means; and
   a fixed section including a light source for emitting the laser beam, detecting means for detecting amounts of deviation in focusing and tracking, focusing control means for controlling focusing on the basis of a detection signal from said detecting means, tracking control means for optically controlling fine tracking of the laser beam, a signal separating circuit for separating a signal outputted from said detecting means and corresponding to an amount of deviation in tracking into a high-frequency-side signal and a low-frequency-side signal, a first driving control circuit for controlling the driving of said driving means on the basis of the low-frequency-side signal separated by said signal separating circuit, and a second driving control circuit for controlling the driving of said tracking control means on the basis of the high-frequency-side signal separated by said signal separating circuit.

2. The apparatus according to claim 1, wherein said driving means includes a linear motor.

3. The apparatus according to claim 1, wherein said detecting means includes two two-split light-receiving elements.

4. The apparatus according to claim 1, wherein said focusing control means includes a converging convex lens and an actuator for moving said converging convex lens in a direction of an optical axis.

5. The apparatus according to claim 1, wherein said tracking control means includes a diverging convex lens and an actuator for moving said diverging convex lens in a direction perpendicular to that of an optical axis.

6. The apparatus according to claim 1, wherein said signal separating circuit includes two filter circuits.

* * * * *